Aug. 5, 1969     J. L. CRAWFORD ET AL     3,458,928
METHOD FOR FORMING ROTOR CONSTRAINED ELECTRICAL COILS
Filed Feb. 23, 1966     2 Sheets-Sheet 1

INVENTORS
JAMES L. CRAWFORD
PAUL J. STAEBLER
BY
*Berman, Bennold, Fint & Phillips*
ATTORNEYS Aug. 5, 1969     J. L. CRAWFORD ET AL     3,458,928
METHOD FOR FORMING ROTOR CONSTRAINED ELECTRICAL COILS
Filed Feb. 23, 1966     2 Sheets-Sheet 2

INVENTORS
JAMES L. CRAWFORD
PAUL J. STAEBLER
BY
ATTORNEYS

United States Patent Office 3,458,928
Patented Aug. 5, 1969

3,458,928
METHOD FOR FORMING ROTOR CONSTRAINED ELECTRICAL COILS
James L. Crawford, Chillicothe, and Paul J. Staebler, Peoria, Ill., assignors to Caterpillar Tractor Co., Peoria, Ill., a corporation of California
Filed Feb. 23, 1966, Ser. No. 529,365
Int. Cl. H01f 7/00; H02k 15/04
U.S. Cl. 29—605
7 Claims

ABSTRACT OF THE DISCLOSURE

In a method for winding electrical coils, a split bobbin is first assembled about the reduced core portion of a rotor between two of its axially spaced apart radially projecting pole pieces. A pair of removable split annular coil side forms is then assembled about the core, one on each side of the split bobbin. Conductor is wound about the bobbin and simultaneously epoxy resin may optionally be applied to each layer of the wound coil. The outermost layer thereof is then wound with banding tape, the rotor constrained coils are cured, and the pair of coil side forms removed. Additional banding, grinding, and curing of the formed coil may optionally follow.

This invention relates to a method for forming electrical coils and more particularly to a method for forming electrical coils about the core portion of a U-shaped body of revolution such that the finished coil is both constrained by the body with which it is associated and at the same time capable of limited movement with respect thereto. Typical use of the invention is found in the winding of a field coil about the core portion of a rotor which core separates the radially projecting pole pieces integral with the rotor. In this use, the completed field coil is, in effect, locked to the rotor, but, if not otherwise held, is free to rotate about the core portion and to have limited axial movement along the core portion without touching the rotor.

This method, more particularly, finds application in forming stationary field windings in association with a one-piece multiple pole rotor. Reference is made to assignee's copending U.S. patent application Ser. No. 340,683 which teaches the use of a stationary field coil disposed circumjacent the reduced core portion of a single piece rotor between axially spaced apart radially projecting pole pieces. The field coil therein is held stationary and the single piece rotor is capable of rotation without contacting the field coil.

It is, therefore, an object of this invention to provide a method for forming an electrical coil for permanent location between opposed confining portions of a member generally in the nature of a U-shaped body of revolution, yet capable of having limited mechanical freedom independent of the body.

It is another object of this invention to provide a method for forming an electrical coil of varied number of turns, the start and finish leads of which are each suitably disposed in relation to the wound coil for ease of electrical connection.

It is yet another object of this invention to provide a practicable method for forming a well insulated, mechanically strong and concentric electrical coil.

It is another object of this invention to provide a method for forming an electrical coil about the reduced core portion of a solid multiple pole rotor and between two of its axially spaced apart radially projecting pole pieces, such that the finished coil may rotate about this reduced core portion and have limited axial movement between two of these spaced apart pole pieces, the rotation and movement capable of occurrence without touching the rotor.

Figure 1:
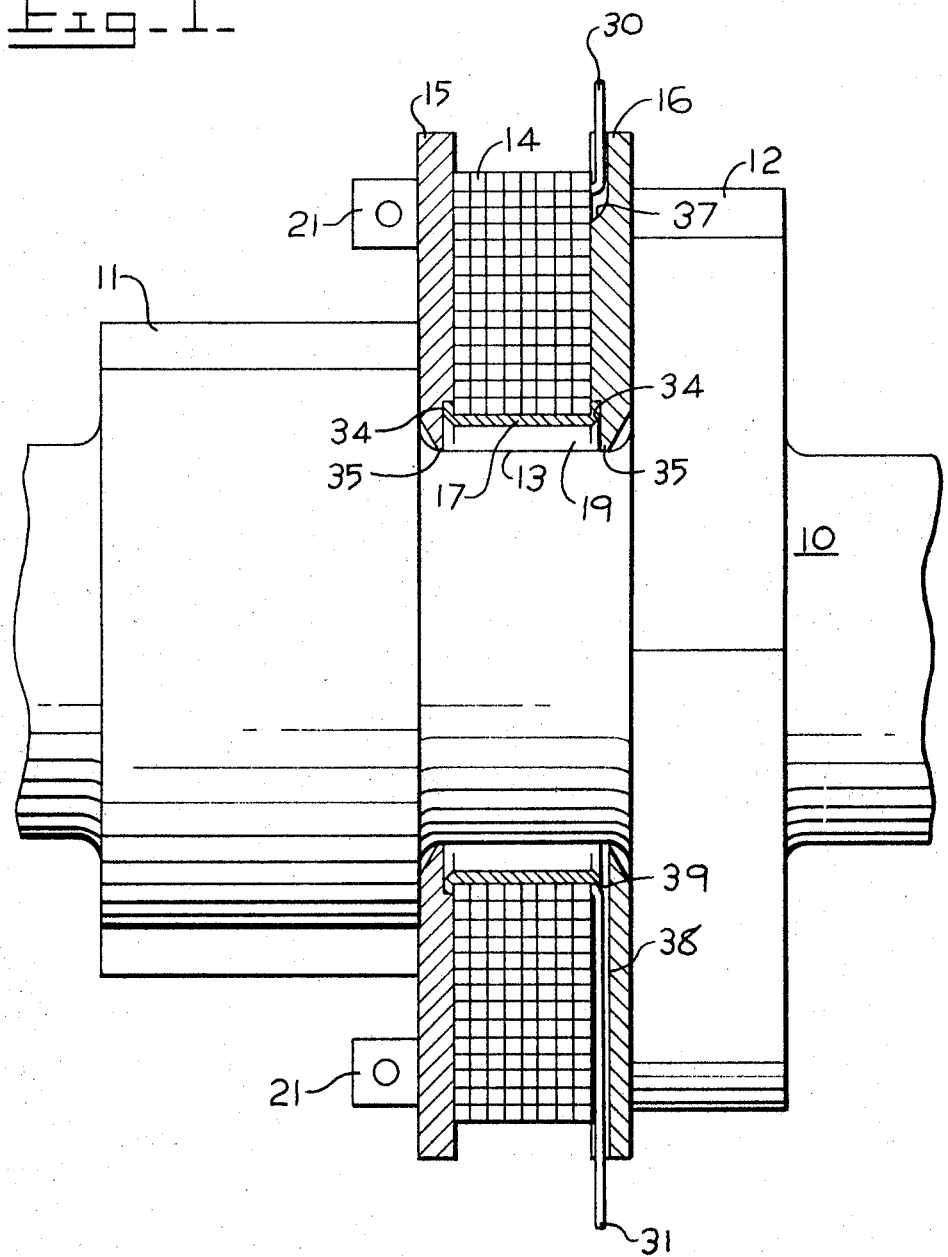
Figure 3:
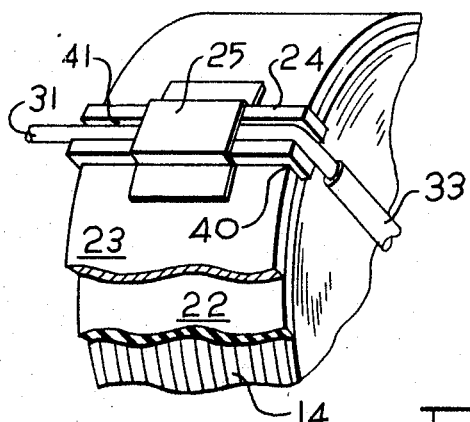
Figure 4:
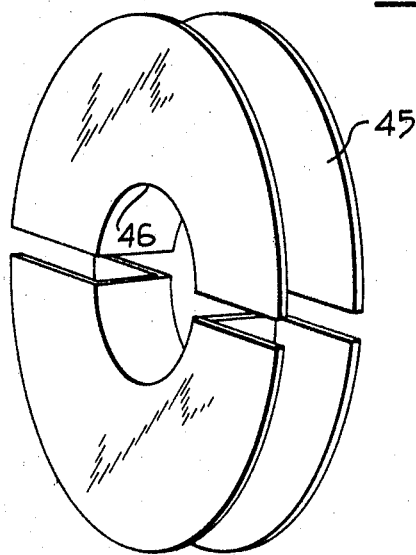
Figure 2:
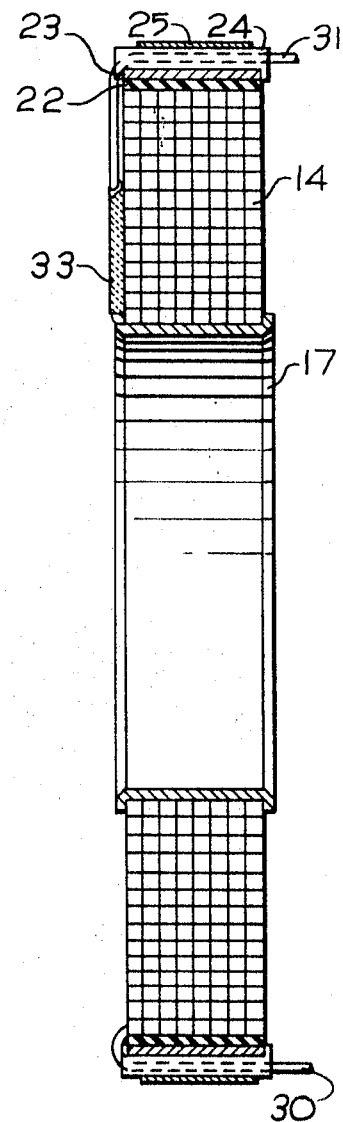

In the drawings:
FIG. 1 is a sectional view of a field coil wound by the method of this invention and disposed between two rotor pole pieces;
FIG. 2 is a sectional view of a finished field coil wound by the method taught herein;
FIG. 3 is a fragmentary view of a segment of a field coil at an area on its periphery; and
FIG. 4 is an isometric view of a split phenolic bobbin which may also be used in the method of this invention.

Referring to the drawings, FIG. 1 shows a portion of a rotor 10 having integral radially projecting pole pieces 11 and 12 separated by core portion 13 which together combine to form a generally U-shaped body of revolution. A field coil winding 14 is wound onto a split aluminum bobbin 17 (shown in section having attenuated radially extending flanges) and between split annular clamps or coil side forms 15 and 16. Bobbin 17 and the coil side forms 15 and 16, when assembled, consitute a coil form. Tabs 21 on the coil side form 15 and similar tabs (not shown) on the coil side form 16 provide means by which mating halves of the split side forms are clamped together. When assembled about the core portion 13, the coil side forms 15 and 16 form a slip fit between the radial walls of the pole pieces 11 and 12 and the edges of bobbin 17. The halves of bobbin 17 are held in a mating relationship by recesses 34 in the coil side forms 15 and 16. The coil side forms have legs 35 which bear against the core portion 13. Area 19 is an air gap.

The coil side form 16 is recessed to provide a radial slot 37 by which finish lead 30 is exited from the coil 14 and is also diametrically recessed to provide a radial slot 38 by which start lead 31 is exited. Bobbin 17 is also recessed to provide an axial slot 39 to facilitate the exiting of start lead 31. FIGS. 2 and 3 shows the completed coil wrapped with an insulating material 22 and with a rigid protective cover 23.

The split bobbin 17 is constructed from rigid insulating material or may be constructed of aluminum with its inner surfaces coated with an insulation material, (e.g., a thin layer of Scotchcast brand epoxy resin No. 260 suitably cured to form a hard surface). Coil side forms 15 and 16 are preferably constructed of material which is nonadhesive with whatever binding substance is used to coat the conductor. If epoxy resin is used as the binding substance, the inner or coil bearing surfaces of the coil side forms are coated with a nonadhesive substance such as Teflon.

The coil form is assembled about the U-shaped body of revolution such as the core between the pole pieces of the rotor. Once the start lead 31 of the electrical conductor is fitted along radial slot 38 and axial slot 39, the winding operation begins. A generous coating of binding substance, such as epoxy resin, at a tempearture suitable to facilitate spreading, is applied to each layer of wound conductor. The outermost layer of wound conductor is then wrapped with glass banding tape 22 containing a binding agent such as polyester resin. These steps are repeated for each coil whereupon the rotor and wound coil forms are curled in an oven at approximately 150° F. for approximately two hours, and thereafter at a temperature and for a time period prescribed for the resinous material used. The curing temperatures and durations are governed by the type of insulation material used. The coils are then allowed to cool slowly. The cured coil is now a substantially solid mass. The solidified glass insulation is then ground concentric with bobbin 17. Thereupon coil side forms 15 and 16 are disassembled and removed leaving the solidified coils 14 free to move about the core portion within the confines of the pole pieces. The blass banding tape is then thinly coated with a binding substance, such as an epoxy resin, whereupon a rigid protective covering such as stainless steel band 23, the inner mating surface of which is similarly coated, is installed tightly about tape 22. Once more the rotor coil assembly may be cured in an oven at the curing temperature of the binder for the prescribed time.

The start lead 31 and finish lead 30 are located diametrically along the same side of coil 14, according to the method of this invention, and thus do not interfere with the insulating and covering steps above referred to and remain undamaged thereby. Start lead 31 remains bonded to the side of the coil due to the setting of the epoxy resin 33 which enters radial slot 39 during the winding and coating steps. For greater protection leads 31 and 30 may be further insulated with a type of glass sleeving (not shown). Finally it may be desired to lead the start and finish leads away from the coil across its outer periphery. Reference is made particularly to FIG. 3 showing start lead 31 bent across the outer periphery of the coil and nestled in recess 41 in coil lead guide 24 also suitably recessed at 40 to mate with stainless steel band 23. Metal clip 25 may be spot welded to band 23. It will be understood that the coil leads may also be secured as by imbedding a portion of each lead in the glass banding material on the coil O.D. (not shown).

In copending U.S. application Ser. No. 340,683, coils 14 are held stationary by holding means associated with the stator. Steel band 23 insures that the coil is rigidly supported by the holding means. Furthermore, coil lead guide 24 is useful to align the coils with respect to the stator by inserting the coil lead guides 24 in complementary stator slots.

Referring to FIG. 4, a split bobbin 45 constructed of a rigid insulating material such as moulded phenolic, offers an alternative to the use of split bobbin 17 of attenuated radially extending flanges and epoxy coating of the wound layers of conductor. The inner diameter 46 of the bobbin 45, like the inner diameter of the alternative bobbin 17, is again greater than the diameter of the core portion 13. When the split bobbin 45 is used, it is assembled circumjacent the core portion and held there by the slip fit of the assembled coil side forms 15 and 16 and pole pieces. The coil side forms 15 and 16 insure the necessary axial clearance for the completed coil wound on the bobbin 45 once they are disassembled and removed. The electrical conductor is wound onto the bobbin 45 and it is not necessary to coat each layer of wound conductor with epoxy resin since the sides of the bobbin 45 are sufficiently rigid to insure a solid coil; however, in most instances it will be found desirable to coat successive layers of wound conductor with an epoxy resin to provide improved heat transfer characteristics.

The last layer, however, is preferably coated with epoxy resin prior to wrapping it with glass banding tape as hereinbefore described. Succeeding steps thereafter are also as hereinbefore described. The bobbin 45 may contain radial slots (not shown) similar to radial slots 37 and 38 previously described.

We claim:
1. A method for forming an electrical coil about the core portion of a generally U-shaped body of revolution having spaced apart end portions the diameters of which are greater than a core portion therebetween, the steps comprising:
  assembling about the core portion a split bobbin having an inner diameter greater than the diameter of the core and smaller than the diameter of either end portion;
  assembling about the core portion a pair of removable split annular coil side forms, one on each side of the bobbin;
  winding elongate electrical conductor material about the bobbin until the bobbin is substantially filled to a set height above the inner diameter;
  causing the conductor in the bobbin to act as a substantially rigid self-supporting structure; and
  disassembling and removing said coil side forms whereby the wound material is free to rotate about the body core and move longitudinally between the body end portions.

2. The method of claim 1 wherein the penultimate step includes:
  coating the elongate material as it is wound onto the form with a binding substance.

3. The method of claim 1 wherein said penultimate step includes:
  coating the last layer of elongate material with a binding material which hardens when cured.

4. The method of claim 2 further comprising the steps of:
  wrapping the formed coil with insulating material before removing the form sides; and
  curing the combined coil and insulating material.

5. The method of claim 4 further comprising the step of:
  disposing a stainless steel band around the insulating material.

6. The method of claim 1 further comprising the steps of:
  disposing the lead end of the elongate material in a slot formed in one coil side form immediately prior to winding the elongate material onto the bobbin, and allowing a length of the lead end to extend beyond the coil side forms;
  disposing the terminating end of the elongate material in a slot formed in the same coil side form as houses the slot for the lead end and approximately diametrically opposed therefrom, and allowing a length of the terminating end to extend beyond the coil side forms.

7. The method of claim 6 further comprising the further steps of:
  insulating the extending lead and terminating ends of the elongate material; and
  securing the elongate material ends to the outer circumference of the finished coil.

References Cited
UNITED STATES PATENTS

| | | | |
|---|---|---|---|
| 1,944,870 | 1/1934 | Apple | 29—605 X |
| 2,038,446 | 4/1936 | Redmond | 310—194 |
| 2,285,233 | 6/1942 | Smith | 29—598 |
| 2,863,609 | 12/1958 | Link | 29—605 X |
| 3,182,384 | 5/1965 | Carlson et al. | 29—605 |
| 3,305,740 | 2/1967 | Shano | 310—42 |
| 3,312,847 | 4/1967 | Waclaw | 29—598 X |

JOHN F. CAMPBELL, Primary Examiner

C. E. HALL, Assistant Examiner

U.S. Cl. X.R.

29—596, 606; 310—42